A. J. TRIGWELL.
STORAGE BATTERY.
APPLICATION FILED DEC. 29, 1919.

1,367,287.

Patented Feb. 1, 1921.

INVENTOR
Alfred J. Trigwell
By John A. Naismith
HIS ATTORNEY

UNITED STATES PATENT OFFICE.

ALFRED J. TRIGWELL, OF SAN JOSE, CALIFORNIA.

STORAGE BATTERY.

1,367,287.  Specification of Letters Patent.  Patented Feb. 1, 1921.

Application filed December 29, 1919. Serial No. 347,943.

*To all whom it may concern:*

Be it known that I, ALFRED J. TRIGWELL, a subject of the King of Great Britain, and residing at San Jose, in the county of Santa Clara and State of California, have invented certain new and useful Improvements in Storage Batteries, of which the following is a specification.

My invention relates to reinforcements for battery plates.

In an electric storage battery, especially of the type wherein a series of lead plates are immersed in an electrolyte with intervening separator sheets of wood, it is common occurrence for the plates to buckle through overheating or other causes thereby pinching through the wood separator sheets and short circuiting.

It is the object of my invention to provide a means whereby the said separator sheets of wood may be associated with separating elements so formed and constructed as to effectively reinforce the edges and body of each plate whereby to prevent distortion of the same without interfering with the action thereof.

In the drawings:—

Figure 1:
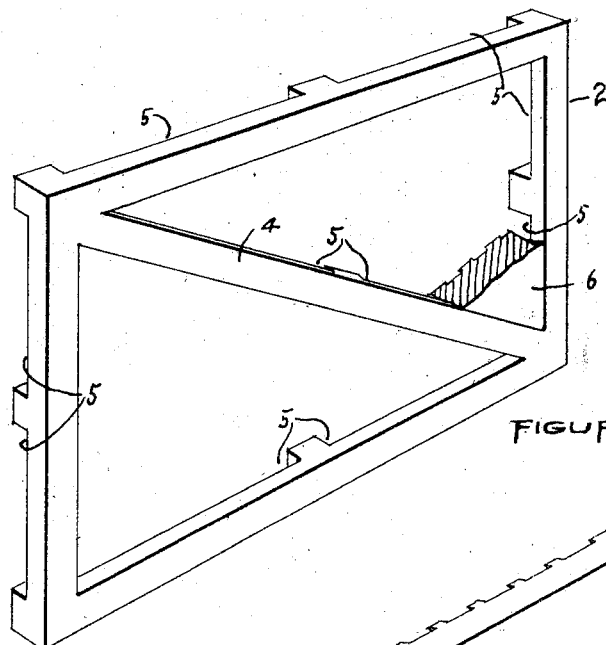
Figure 1 is a perspective view of one of the reinforcing elements forming the subject of this invention.
Figure 2:
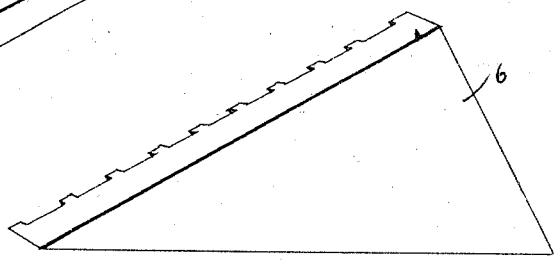
Fig. 2 is a perspective view of one portion of the wood separator plate used in conjunction with the reinforcing element shown in Fig. 1.

Referring more particularly to the drawing, 1 indicates a battery plate of suitable materials and proportions. A frame 2 encircles the plate covering a narrow strip of the same contiguous to its outer edge and preferably having its outer edges flush with the outer edges of said plate as shown at 3. This frame is preferably made of vulcanized rubber or any other suitable material of sufficient strength and rigidity to resist the warping tendencies of the plates when heated. I prefer also to connect two of the opposite corners of the frame 2 with a cross member 4 to reinforce the central portion of the same. These members 2 and 4 are provided with grooves as 5 to permit the proper circulation of the electrolyte.

In this construction bearing surfaces are provided at each of the four corners of the plate 1 and also at the center thereof effectually preventing distortion of the plate from any cause whatever, the several grooves 5 permitting the free circulation of the electrolyte over substantially the whole surface of the plate.

Figure 3:
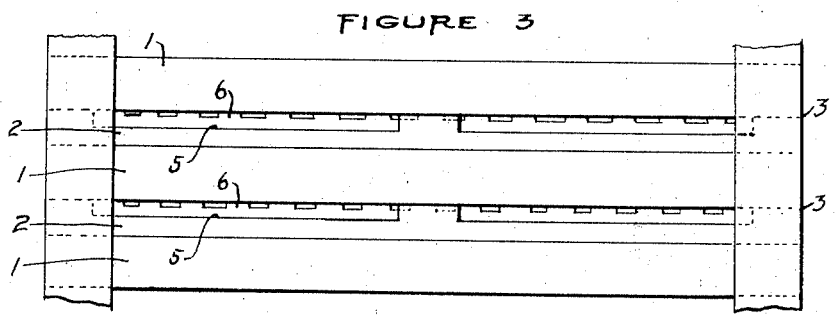
Fig. 3 is a plan view of three battery plates fitted with the separator forming the basis of this invention.

In this form of my invention the wood screen is cut into two triangular pieces as at 6, each triangular piece fitting closely in one of the triangular openings in frame 2 in the position shown in Fig. 3, with the vertical grooves therein communicating with the top and bottom grooves 5.

It is clear from the foregoing that I have provided means for the purpose specified, that exposes a maximum amount of the plate surface, effectually prevents warping of the plate at any point, permits the proper circulation of the electrolyte, is simple and cheap to manufacture, and is quickly and easily placed in position.

It is understood that I do not wish to confine myself to the specific form of the invention set forth, herein, but to include all changes in form, construction and method of application that may be made within the scope of the appended claims.

I claim:—

1. A separator and reinforcement for battery plates comprising a frame of rigid material and of substantially the same outer dimensions as the plate in conjunction with which it is to be used, and a cross member of rigid material connecting opposite corners of said frame, said frame and cross member being provided with spaced bearing surfaces substantially as shown and described.

2. A separator and reinforcement for battery plates comprising a frame of insulating material of substantially the same outer dimensions as the plates in conjunction with which it is to be used and insertible therebetween and provided with spaced bearing surfaces and having a plurality of openings formed therein adapted to receive screening means.

3. A separator and reinforcement for battery plates comprising spacing elements of insulating material, spaced means for maintaining said spacing elements in a given position with relation to each other, screening means pervious to an electrolyte filling the spaces between said first mentioned means, and means for permitting the circulation of the electrolyte past said first mentioned means.

4. A separator and reinforcement for battery plates comprising a narrow frame of insulating material of substantially the same outer dimensions as the plates in conjunction with which it is to be used and insertible therebetween and having a raised bearing surface at each corner and on one side thereof.

5. A separator and reinforcement for battery plates comprising a frame of insulating material adapted to receive screening means insertible between said plates and provided with passages in the side portions thereof for the circulation of the electrolyte therethrough.

6. A separator and reinforcement for battery plates comprising a frame of insulating material of substantially the same outer dimensions as the plates in conjunction with which it is to be used and insertible therebetween and provided with spaced bearing surfaces and having a plurality of openings formed therein adapted to receive screening means and other openings formed in the side portions of the frame for permitting the lateral circulation of the electrolyte.

7. A separator and reinforcement for battery plates comprising a narrow frame of insulating material of substantially the same outer dimensions as the plates in conjunction with which it is to be used and insertible therebetween and having a raised bearing surface at each corner and on one side thereof with intermediate spaces for permitting the circulation of the electrolyte laterally past the plate edges.

8. A separator and reinforcement for battery plates comprising a spacing frame of insulating material and of substantially the same outer dimensions as the plates in conjunction with which it is to be used and insertible therebetween, and a cross member formed integrally with said frame and connecting opposite portions thereof and provided with passages for permitting the circulation of the electrolyte therethrough.

ALFRED J. TRIGWELL.